Aug. 8, 1950  B. B. KORN  2,517,887
CLUTCH DRIVE
Filed Dec. 6, 1948

BERNARD B. KORN.
INVENTOR.

BY W. E. Beatty

ATTORNEY.

Patented Aug. 8, 1950

2,517,887

UNITED STATES PATENT OFFICE 2,517,887

CLUTCH DRIVE

Bernard B. Korn, Los Angeles, Calif.

Application December 6, 1948, Serial No. 63,750

2 Claims. (Cl. 64—30)

The invention relates to a clutch drive. While the invention is illustrated as applied to the take-up reel or reels of a film magazine, the invention may be applied to other types of driven devices.

An object of the invention is to provide a clutch drive wherein the clutch has a movable and inaccessible plate in close space relation to a bearing support, with a remote and accessible spring for applying clutch pressure through the bearing, without thereby adding any drag to the shaft.

Another object is to provide an accessible adjustable clutch spring for an inaccessible clutch.

A further object of the invention is to provide an improved form of bracket for supporting the clutch in operative relation to a driving motor as well as an improved mount for an idler pulley for taking up slack in a belt between the motor and the clutch drive.

For further details of the invention reference may be made to the drawings wherein.

Figure 1:
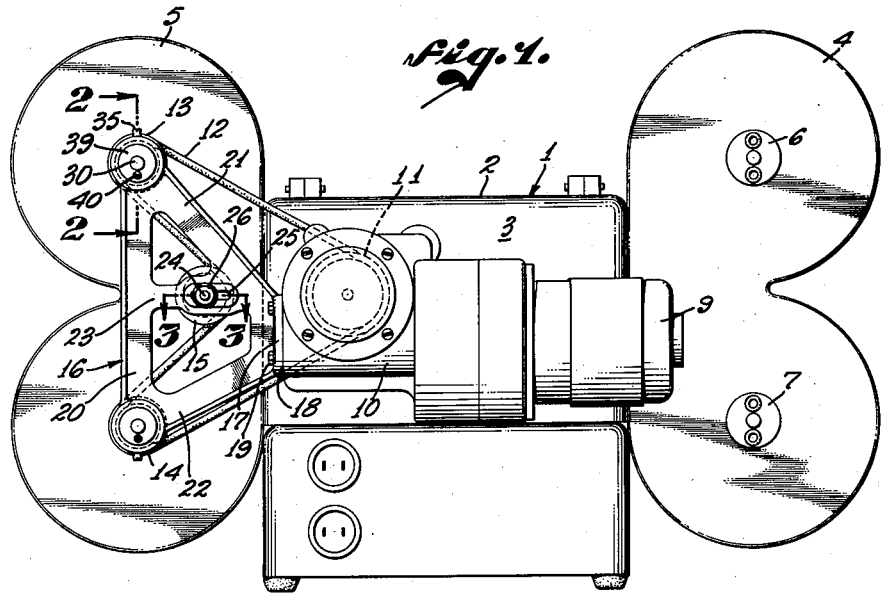
Fig. 1 is a rear view in elevation of a motion picture printer having the clutch drive and bracket of this invention.
Figure 2:
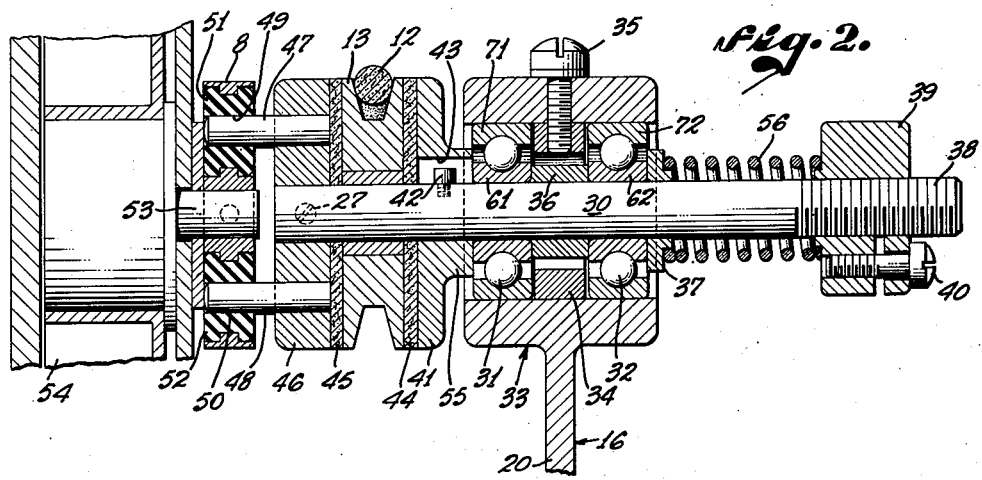
Fig. 2 is an enlarged sectional view on line 2—2 of Fig. 1 looking in the direction of the arrows.
Figure 3:
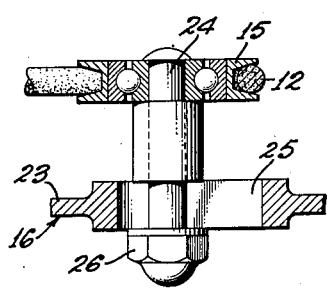
Fig. 3 is a sectional view on line 3—3 of Fig. 1 looking in the direction of the arrows.

Referring in detail to the drawings, the motion picture printer 1 comprises a casing 2 having a rear wall 3, with a film supply magazine 4 at one end of the casing 2, and a film take-up magazine 5 at the other end of the casing. Film magazine 4 has a coupling 6 for an upper reel of raw stock, and a coupling 7 for a lower reel of developed film to be printed on to the raw stock. The magazine 5 has an upper coupling 8, see Fig. 2, for the take-up reel for the raw stock, and a lower coupling similar to 8 to take up the other film.

The nature of the film drive and printing gate in the casing 2 form no part of the present invention. The film drive includes one or more driven sprockets not shown which are driven by a motor 9 having a suitable reduction gear in a housing indicated at 10, such gearing terminating in a drive pulley 11 between the reduction gear 10 and the rear wall 3. Pulley 11 is provided with a belt 12 which passes around the pulley 13 for coupling 8 and around pulley 14 for the lower coupling similar to 8. That portion of the belt 12 intermediate the pulleys 13 and 14, passes around an idler pulley 15 which is adjustable to take up slack.

Pulleys 13, 14 and 15 are mounted on a bracket 16. Bracket 16 has at the rear thereof an angle flange 17 which fits the vertical face 18 of the reduction gear housing 10, being secured thereto by bolts like 19.

The bracket 16 is an open unitary frame-work somewhat in the form of a trapezoid wherein the inner vertical flange 17 is parallel to the outer side or arm 20, the pulleys 13 and 14 being arranged at the top and bottom, respectively, of the arm 20, with arm 20 braced by the inwardly sloping sides 21 and 22 which merge with the top and bottom, respectively, of the flange 17. The pulley 15 is supported by a cross arm 23 extending from the side 20 to the flange 17 where it joins with the side 21. Pulley 15 has an axle 24 which is adjustably held in an elongated slot 25 in the arm 23 by a nut 26.

The clutch drive for the pulley 13 is the same as the clutch drive for pulley 14, and only the drive for pulley 13 will be described in detail. Pulley 13 is loosely mounted on a shaft 30, the latter being rotatably and slidably supported by ball bearings 31, 32 slidably mounted in a bearing support 33 on the bracket 16. Ball bearing 31 has an inner race 61, and an outer race 71. Bearing 32 has an inner race 62 and an outer race 72. Between the bearings 31 and 32 is a separator stop ring 34 removably held in position in bearing support 33 by a screw 35. Separator 34 is shorter in an axial direction than a spacing ring 36 between and abutting the adjacent surfaces of the inner races 61, 62 so that when spring 56 applies a force to one of the races 61, 62 to slide it along the shaft 30, such force will be communicated through ring 36 to the other race to slide it a like amount.

Adjustable clutch pressure is applied to the outer race 62 by a compression spring 56 around shaft 30 and bearing on a spring follower in the form of a disk 37 which bears on the outer face of race 62. The shaft 30 is threaded at its outer end as indicated at 38 and provided with a nut 39 serving as a stop for the outer end of spring 56. Nut 39 has a suitable lock screw 40. The inner face of the race 61 bears on the hub 55 of a clutch plate 41. Plate 41 is slidable on shaft 30 and keyed thereto by a key 42 in the shaft 30 and a cooperating axial slot 43 in the clutch plate 41. A disk 44 of suitable frictional material is arranged between the inner face of plate 41 and the outer face of pulley 13 and a similar disk 45 of frictional material is arranged between the inner face of pulley 13 and the outer face of a coupling member 46 fixed to shaft 30 by a set screw 27. Coupling member 46 has a pair of axially extending and diametrically opposite pins 47 and 48 removably receiving corresponding apertures 49 and 50 in rubber inserts 51, 52, respectively, in the coupling member 8 which is fixed to the spindle 53 of the take-up reel 54.

It will be apparent, therefore, that the coupling member 46 serves as an abutment fixed on the shaft 30 for all of the remaining elements of the clutch as well as inner races 61, 62, all of which are slidable on the shaft 30 and held under a suitable pressure by the spring 56.

As a result of the above construction, the nut 39 can be adjusted to adjust the force of spring 56 to vary the slippage of pulley 13, i. e., the pressure of the clutch 41, 44, 13, 45, 46. Such spring pressure does not add any braking effort to the rotation of shaft 30 which is free running, as the spring pressure acts on clutch plate 41 through the inner races 61, 62 which revolve with the shaft 30, and not through the outer races 71, 72 which do not revolve in their bearing support 33. Also the invention provides a very compact arrangement wherein the coupling 8, pulley 13 and bearing support 33 are closely spaced together, with the adjusting nut 39 readily accessible, although plate 41 is not.

The magazines 4 and 5 are removably mounted on the casing 2 by suitable means not shown. The magazine 5 is uncoupled from its clutch drive by moving it in a plane parallel to itself, to withdraw the coupling members like 8 from their pins like 49 and 50.

The spring 56, as is well known, is adjusted to have a tension such that the pulley 13 will slip before the film breaks.

Various modifications may be made in the invention without departing from the spirit of the following claims.

I claim:

1. A clutch drive comprising a rotatable shaft having a bearing support, a coupling member fixed to said shaft, a power transmission device rotatable on said shaft, for said coupling member, and a movable clutch element for said device and said member on one side of said bearing support, a ball bearing slidable in said bearing support and slidably supporting said shaft, said bearing having an inner race on said shaft, and a compression spring on the other side of said bearing and acting through said inner race on said movable clutch element.

2. A clutch drive according to claim 1 comprising a movable abutment on said shaft at said other side of said bearing for adjusting the force of said spring.

BERNARD B. KORN.

REFERENCES CITED

The following references are of record in the file of this patent:

UNITED STATES PATENTS

| Number | Name | Date |
|---|---|---|
| 2,367,140 | Ress | Jan. 9, 1945 |